United States Patent
Strangfeld et al.

(10) Patent No.: US 7,622,689 B2
(45) Date of Patent: Nov. 24, 2009

(54) SWITCH ACTUATOR

(75) Inventors: Bruce A. Strangfeld, Eau Claire, WI (US); Jason G. Pecor, Eau Claire, WI (US)

(73) Assignee: Integrated Device Technology Inc., San Jose, CA (US)

(*) Notice: Subject to any disclaimer, the term of this patent is extended or adjusted under 35 U.S.C. 154(b) by 0 days.

(21) Appl. No.: 12/004,501

(22) Filed: Dec. 20, 2007

(65) Prior Publication Data

US 2008/0169179 A1    Jul. 17, 2008

Related U.S. Application Data

(60) Provisional application No. 60/871,202, filed on Dec. 21, 2006.

(51) Int. Cl.
*H01H 13/00* (2006.01)
*H01H 9/18* (2006.01)

(52) U.S. Cl. .................. 200/343; 200/314; 200/296; 200/329

(58) Field of Classification Search ............. 200/329, 200/333, 341–345, 296, 310–317
See application file for complete search history.

(56) References Cited

U.S. PATENT DOCUMENTS

| | | | | | |
|---|---|---|---|---|---|
| 4,032,729 | A | * | 6/1977 | Koistinen | 200/5 A |
| 4,323,740 | A | * | 4/1982 | Balash | 200/5 A |
| 4,967,467 | A | * | 11/1990 | Udagawa | 29/622 |
| 4,997,998 | A | * | 3/1991 | Bauer | 200/345 |
| 5,784,891 | A | * | 7/1998 | Lee | 62/126 |
| 6,051,957 | A | * | 4/2000 | Klein | 320/132 |
| 6,078,164 | A | * | 6/2000 | Park | 320/107 |
| 6,950,030 | B2 | * | 9/2005 | Kovarik et al. | 340/636.1 |
| 7,189,937 | B2 | * | 3/2007 | Chen | 200/343 |
| 7,193,171 | B2 | * | 3/2007 | Areh et al. | 200/343 |
| 7,342,381 | B2 | * | 3/2008 | Johnson et al. | 320/136 |

* cited by examiner

*Primary Examiner*—Michael A Friedhofer
(74) *Attorney, Agent, or Firm*—Henneman & Associates PLC

(57) ABSTRACT

A switch activator includes a tongue including a first end and a second end and a surrounding portion. The tongue is joined to the surrounding portion at the first end and has a pressing point adjacent the second end. The tongue may be joined by glue, a heat stake or a rivet. Preferably, the tongue and the surrounding portion integrally formed in a surface. This invention provides a very low cost method of actuating a SOCI (State Of Charge Indicator) push-button switch under the requirements of MIL-PRF-49471B, paragraph 4.7.17.

10 Claims, 1 Drawing Sheet

SWITCH ACTUATOR

RELATED APPLICATIONS

This application claims the benefit of U.S. Provisional Patent Application No. 60/871,202, filed on Dec. 21, 2006, by the same inventor, which is incorporated herein by reference in its entirety.

FIELD OF THE INVENTION

The present invention relates to switch actuators and is particularly concerned with those integrally formed in a plastic case housing an underlying switch.

BACKGROUND OF THE INVENTION

A variety of technologies call for a switch activator that allows mechanical activation of a switch housed within a case. For example U.S. Pat. No. 6,844,873, issued Jan. 18, 2005 discloses a computer pointing device, such as a mouse or trackball, that includes a reverse cantilever button assembly to match strength-related variations in user hand size. In one embodiment a button assembly is built with two cantilever beams, the fulcrums for each beam being at opposite ends of the button assembly.

Another technology relates to batteries. For example military specification MIL-PRF-49471B, paragraph 4.7.17, requires a state-of-charge-indicator (SOCI) to not illuminate when "pressed against a flat, transparent surface with a normal force of 5 pounds minimum." Further complicating matters is the fact that the SOCI printed circuit board assembly, which contains the push-button switch, mechanically floats inside the battery case. So it is difficult to prevent inadvertent operation while still allowing the end user convenient access to the switch.

The MIL-PRF-49471B base document is available at http://assist.daps.dla.mil/quicksearch/. Paragraph 4.7.17 is modified under RFW-GA204-012, 13 Apr. 2006.

SUMMARY OF THE INVENTION

An object of the present invention is to provide an improved switch activator.

In accordance with an aspect of the present invention there is provided a switch activator comprising a tongue including a first end and a second end and a surrounding portion; the tongue joined to the surrounding portion at the first end; and having a pressing point adjacent the second end; the tongue.

In accordance with another aspect of the present invention there is provided a case comprising an first volume-defining surface and a second surface coupled to the first surface and having integrally formed therein a switch activator having a tongue including a first end and a second end and a surrounding portion; the tongue joined to the surrounding portion at the first end; and having a pressing point adjacent the second end.

In accordance with a further aspect of the present invention there is provided A battery case comprising an first volume-defining surface and a second surface coupled to the first surface and having integrally formed therein a switch activator having a tongue including a first end and a second end and a surrounding portion; the tongue joined to the surrounding portion at the first end; and having a pressing point adjacent the second end.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
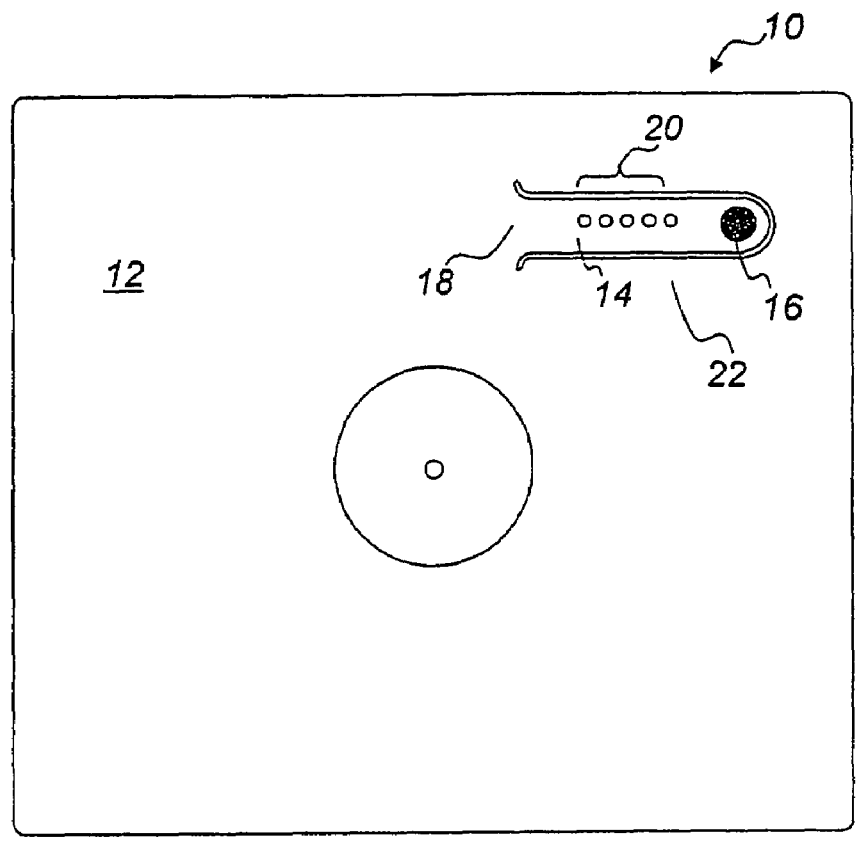
FIG. 1 illustrates an switch activator in accordance with a first embodiment of the present invention.

Referring to FIG. 1 there is illustrated an switch activator in accordance with a first embodiment of the present invention. The switch activator 10 is illustrated in the context of a battery case 12. The switch activator 10 includes a tongue 14 with a press point 16 and an attachment portion 18. The tongue 14 includes a series of holes 20 for viewing underlying LEDS of a state-of-charge-indicator (SOCI) circuit (not shown in FIG. 1) and including a push-button switch contactable by the tongue 14. Preferably, the switch actuator 10 is integrally formed in a surface 20 of the battery case 12.

In operation, the actuator 10 allows operation of the underlying switch (not shown) by applying a predetermined force to the press point 16. The surface 22 surrounding the tongue 14 prevents inadvertent or accidental activation of the underlying switch.

Figure 2:
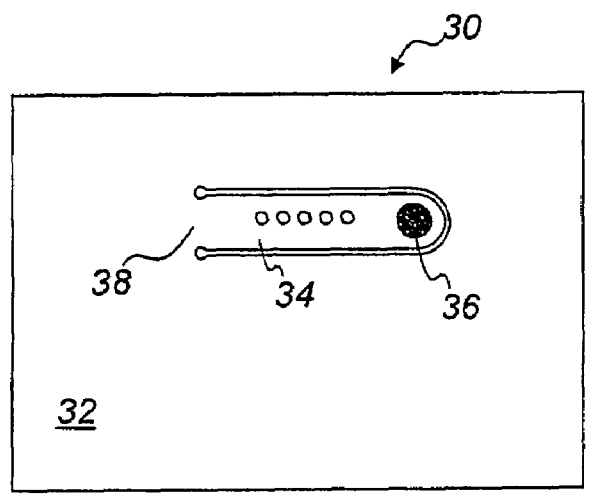
FIG. 2 illustrates an switch activator in accordance with a second embodiment of the present invention.

Referring to FIG. 2 there is illustrated an switch activator in accordance with a second embodiment of the present invention. As with the switch activator of FIG. 1, in the second embodiment the switch activator 30 is preferably integrally formed in a battery case 32 includes a tongue 34 with a press point 36 and an attachment portion 38. The shape of the attachment portion 38 has been modified.

The plastic used in battery cases provides sufficient resiliency to the tongue of the actuator for repeated use over the expected life of the battery. While the embodiments described about have an integrally formed tongue other methods are available. For instance, a 2-shot molded plastic case where the tongue is of a different plastic, possibly more flexible than the battery case could be used. Or one might choose to glue, heat stake or rivet a tongue to the battery case For example, it can be used in battery cases that must comply with military specification, MIL-PRF-49471B, paragraph 4.7.17. This specification requires the SOCI to not illuminate when "pressed against a flat, transparent surface with a normal force of 5 pounds minimum." In the present embodiments of the invention the plastic battery case 10 is modified to provide the tongue 14 which is able deflect inwards. This allows the end user easy actuation of the SOCI push-button switch while preventing inadvertent operation.

A switch activator of the type shown has many uses beyond the battery case use illustrated.

Numerous modifications, variations and adaptations may be made to the particular embodiments described above without departing from the scope patent disclosure, which is defined in the claims.

What is claimed is:

1. A switch activator comprising:
  a tongue including a first end and a second end; and
  a surrounding portion comprising a portion of a battery case;
  the tongue joined to the surrounding portion at the first end; and having a pressing point adjacent the second end;

the battery case including a state-of-charge-indicator having a switch proximate the second end and a series of light emitting diodes and the tongue includes an opening aligned therewith.

2. A switch activator as claimed in claim 1, wherein the tongue and the surrounding pardon integrally formed in the second surface.

3. A switch activator as claimed in claim 1, wherein the tongue is affixed to the surrounding portion integrally.

4. A switch activator as claimed in claim 3, wherein the tongue is affixed by one or more of glue, a heat stake and a rivet.

5. A switch activator as claimed in claim 1, wherein the opening is selected from one of a hole, a series of holes and an elongate slot.

6. A battery case comprising:
a first volume-defining surface and
a second surface coupled to the first surface and having integrally formed therein
a switch activator having a tongue including a first end and a second end and a surrounding portion; the tongue joined to the surrounding portion at the first end;
and having a pressing point adjacent the second end; and
a state-of-charge-indicator having a switch proximate the second end and a series of light emitting diodes and the tongue including an opening aligned therewith.

7. A switch activator as claimed in claim 6, wherein the tongue and the surrounding portion integrally formed in the second surface.

8. A switch activator as claimed in claim 6, wherein the tongue is affixed to the surrounding portion integrally.

9. A switch activator as claimed in claim 8, wherein the tongue is affixed by one or more of glue, a heat stake and a rivet.

10. A switch activator as claimed in claim 6, wherein the opening is selected from one of a hole, a series of holes and an elongate slot.

* * * * *